Jan. 31, 1950        O. THURMAN, JR        2,496,110
DOUBLE RECTILINEAR TORCH MACHINE

Filed Sept. 3, 1947        2 Sheets-Sheet 1

INVENTOR
OLIVER THURMAN JR.
BY
ATTORNEYS

Jan. 31, 1950     O. THURMAN, JR     2,496,110
DOUBLE RECTILINEAR TORCH MACHINE

Filed Sept. 3, 1947     2 Sheets-Sheet 2

INVENTOR
OLIVER THURMAN JR.
BY
ATTORNEYS

Patented Jan. 31, 1950

2,496,110

UNITED STATES PATENT OFFICE 2,496,110

DOUBLE RECTILINEAR TORCH MACHINE

Oliver Thurman, Jr., Mount Tabor, N. J., assignor to Air Reduction Company, Incorporated, a corporation of New York Application September 3, 1947, Serial No. 771,843

6 Claims. (Cl. 266—23)

1

This invention relates to universal gas cutting and welding machines of the type in which a cutting or welding torch and a tracer are both mounted for unitary and universal movement in a plane so that the pattern which the tracer is caused to follow is reproduced by the torch. More particularly, the invention relates to universal gas cutting and welding machines of the so-called "double rectilinear" type. In this type of machine a base carriage, running on a track so that it can move rectilinearly, supports a second carriage or frame on which the tracer and the torch are mounted and which is guided to move at right angles to the direction of movement of the base carriage. Thus, movement of the tracer and torch in any direction in one plane is permitted by movement of either carriage or by their simultaneous movement.

There are two inherent difficulties with double rectilinear machines of the prior art. The first is the inability of the tracer to maintain a true course and a constant speed when a sharp corner is traversed. This is due to the relatively great inertia of the carriages. For example, when the tracer is travelling in a direction parallel to the axis of one of the carriages, the other carriage is at rest. If the tracer should then turn a right angle corner, it is necessary for the moving carriage to stop instantaneously and the stationary carriage to start right out at the tracing speed. This, of course, is impossible due to the inertia of the machine, and the tracer must necessarily slow up and skid, resulting in a change of torch speed and possible deviation from the desired course.

The second difficulty with double rectilinear machines of the prior art is that when the tracer is operating on a course which is at a small angle with the axis of one carriage, the minor component of the tractive force of the tracer is insufficient to pull the second carriage and the traction wheel of the tracer skids and tends to follow a course parallel to the first carriage axis.

According to this invention, a double rectilinear machine is constructed so that motion is transmitted from the tracer carriage to the base carriage, and preferably also from the tracer to the tracer carriage, by a resilient connection to overcome these difficulties. The construction is such that in spite of the lost motion provided, there can be no movement of the tracer without corresponding movement of the torch.

The invention is illustrated in the accompanying drawings, in which:

Figure 1 is a side elevation of a double recti-

2 linear cutting machine constructed according to the invention;

Figure 1:
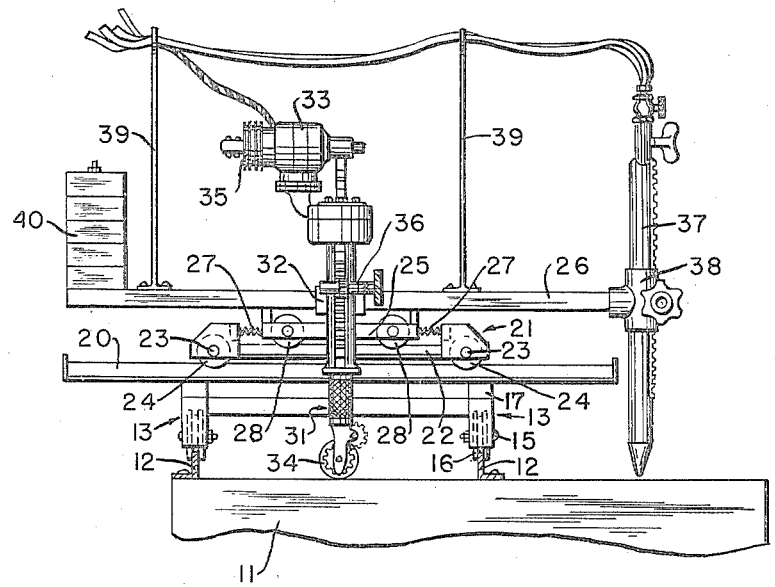
Figure 2:
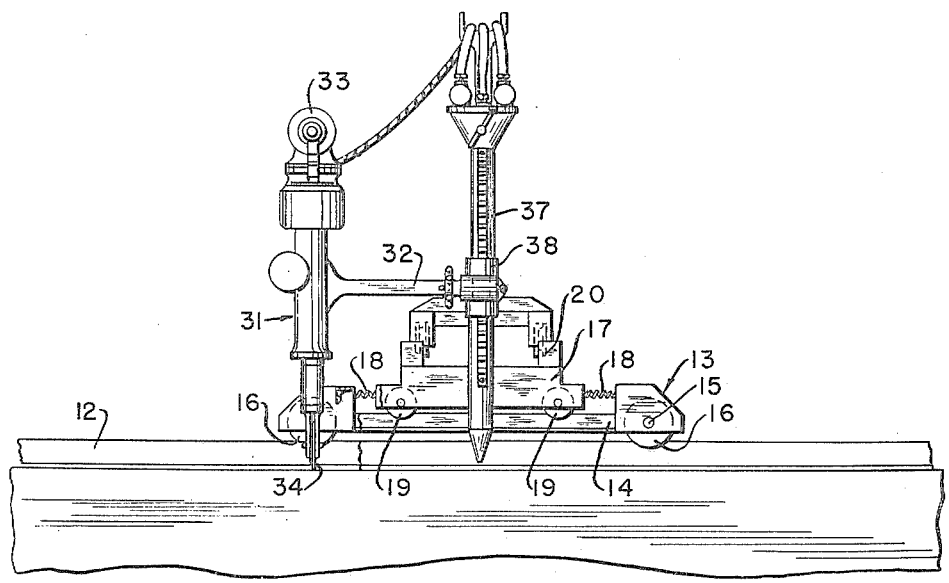
Fig. 2 is a front elevation of the machine of Fig. 1.
Figure 3:
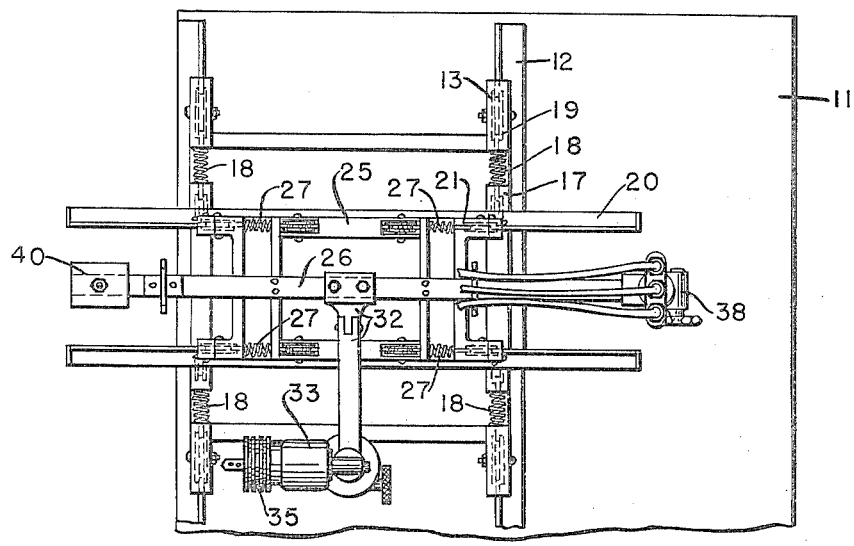
Fig. 3 is a plan view of the same machine.

Referring first to Figs. 1-3, a work table 11, supports rails 12 on which a base carriage 13 operates. This carriage comprises a frame 14, axles 15, and wheels 16. Resiliently mounted on the frame 14 (Fig. 2) is an auxiliary carriage 17 which constitutes a track support for the tracer carriage. The auxiliary carriage 17 is connected to the base carriage by springs 18. The auxiliary carriage or track support 17 rolls on the frame 14 on wheels 19. Rails 20 fastened to the track support 17 support the tracer carriage 21. The rails 20 forming the track for the tracer carriage 21 are mounted at right angles to the rails 12 forming the track for the base carriage 13.

The tracer carriage 21 is similar to the base carriage and comprises a frame 22 (Fig. 1), axles 23, and wheels 24. Resiliently mounted on the frame 22 is a tracer and torch bar mount or second auxiliary carriage 25 to which a tracer and torch bar 26 is fastened. Springs 27 connect the auxiliary carriage 25 to the tracer carriage 21. The auxiliary carriage 25 rolls on the frame 22 on wheels 28. The first auxiliary carriage or track support 17 and the second auxiliary carriage or tracer and torch bar mount 25 need not be wheeled but may slide on their respective main carriages, or be otherwise mounted for guided and limited movement.

A tracing device 31 of any suitable construction may be used to guide the torch or torches. It is rigidly attached to the bar 26 by a bracket and clamp 32 (Fig. 3). In the machine illustrated the tracer is motorized and manually guided as is well known in the art. A motor 33 (Figs. 1 and 2) works through reduction gears to drive the traction wheel 34 at a constant speed which is determined by the setting of a motor governor control 35 (Figs. 1 and 3). A rack and pinion 36 (Fig. 1) is provided to raise the tracer from the work table. A gas torch 37 of conventional design is supported from the bar 26 by a torch holder 38. Support posts 39 (Fig. 1) fastened to the bar 26 support the gas hoses and electrical leads to hold them clear of the apparatus. A counterweight 40 provides stability to the design. It is important to note that the torch and tracer are fixed to the same bar, and therefore fixed with respect to one another, insuring duplicate movement of the torch and tracer at all times. In this form of the invention the bar 26 along with the auxiliary carriage 25 constitutes a support for the tracer and the torch.

With the apparatus described above it is evident that any sudden change in direction of the tracer does not require a sudden change in speed of either of the main carriages 13 and 21. The springs 18 and 27 deflect to allow the tracer to follow the desired course while the inertia of the carriages is being overcome. In addition, if the desired course of the tracer is at a very small angle to the direction of travel of either carriage, the tracer can work against the springs for its minor component of motion, rather than against a non-resilient carriage, allowing the tracer to follow the course accurately.

Figure 4:
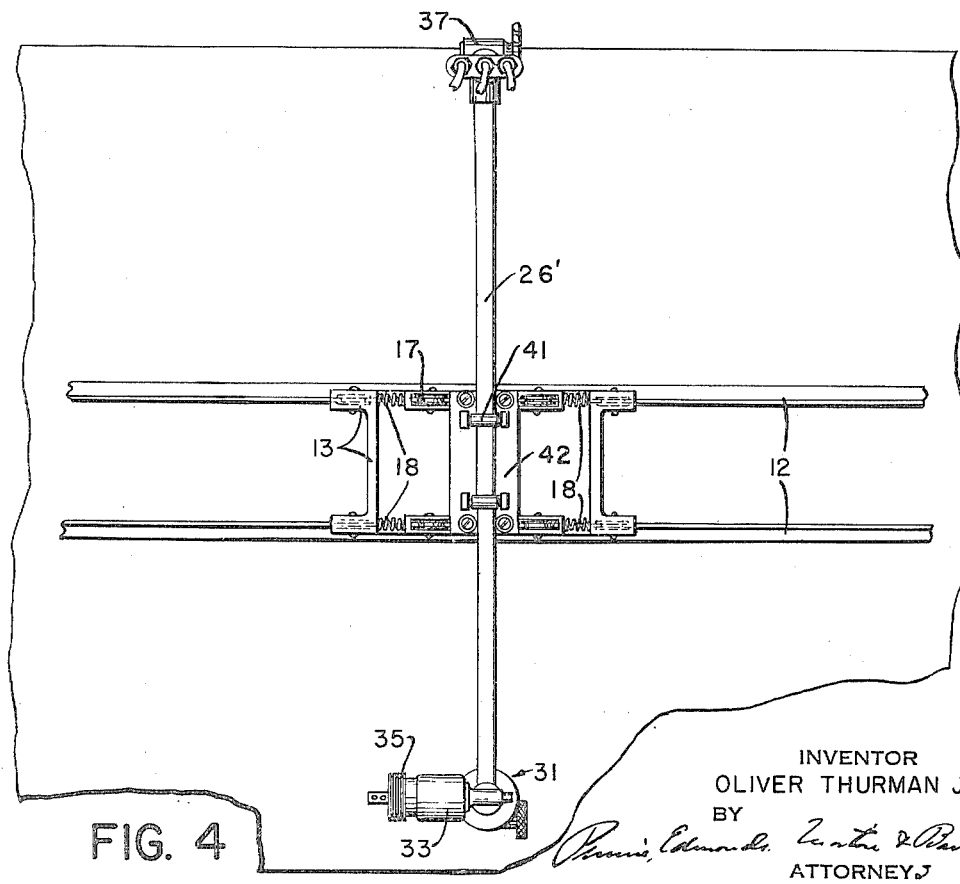
Fig. 4 is a plan view of a modified form of double rectilinear cutting machine embodying the invention.

In the modified form of the invention shown in Fig. 4, the tracer carriage 21 previously described has been eliminated by allowing the tracer and torch bar 26' to run through guide rolls 41 mounted on a member 42 rigidly fastened directly to the first auxiliary carriage 17. The tracer and torch bar 26' therefore in effect constitute a carriage on which the tracer 31 and the torch 37 are mounted and such carriage slides rectilinearly in a direction at right angles to the direction in which the base carriage 13 moves. In this type of construction the inertia of the bar 26' and the torch and tracer carried by it may be negligible and a resilient connection (the springs 18) is required only between the base carriage and the auxiliary carriage.

The invention is not limited to the specific constructions shown but includes any machine of the double rectilinear type having resilient means, whether of the spring type above described or some other type, to overcome the previously mentioned difficulties.

I claim:

1. A double rectilinear torch machine comprising a movable base carriage guided to move rectilinearly, an upper carriage movably mounted on the base carriage and guided to move rectilinearly at an angle to the direction of movement of the base carriage, a tracer and a torch mounted on the upper carriage so that they move in unison and so that they are capable of universal movement in a plane by reason of the double rectilinear movability of the carriages, and resilient means interposed between the upper carriage and the base carriage for transmitting to the base carriage movements of the upper carriage in a direction in which the base carriage is movable.

2. A double rectilinear torch machine comprising a movable base carriage guided to move rectilinearly, an upper carriage movably mounted on the base carriage and guided to move rectilinearly at an angle to the direction of movement of the base carriage, a tracer and torch support mounted for limited movement on the upper carriage, a tracer and torch mounted on said support so that they move in unison and so that they are capable of universal movement in a plane by reason of the double rectilinear movability of the carriages, resilient means interposed between the upper carriage and the base carriage for transmitting to the base carriage movements of the upper carriage in a direction in which the base carriage is movable, and resilient means interposed between said tracer and torch support and the upper carriage for transmitting to the upper carriage movements of said tracer and torch support in a direction in which the upper carriage is movable.

3. A double rectilinear torch machine in accordance with claim 1 in which said resilient means comprises at least one coil spring interposed between the carriages.

4. A double rectilinear torch machine in accordance with claim 2 in which said two resilient means comprises coil springs.

5. A double rectilinear torch machine comprising a movable base carriage guided to move rectilinearly, a support for an upper carriage mounted for limited movement on the base carriage in the same direction that the base carriage is movable, resilient means interposed between said support and the base carriage arranged to transmit to the base carriage movements of the support in a direction in which the base carriage is movable, an upper carriage movably mounted on said support and guided to move rectilinearly at an angle to the direction of movement of the base carriage, and a tracer and torch mounted on said upper carriage so that they move in unison and so that they are capable of universal movement in a plane by reason of the double rectilinear movability of the carriages.

6. A double rectilinear torch machine comprising a movable base carriage guided to move rectilinearly, a support for an upper carriage mounted for limited movement on the base carriage in the same direction that the base carriage is movable, resilient means interposed between said support and the base carriage arranged to transmit movements of the support in a direction in which the base carriage is movable to the base carriage, an upper carriage movably mounted on said support and guided to move rectilinearly at an angle to the direction of movement of the base carriage, a tracer and torch support mounted for limited movement on said upper carriage in the same direction that the upper carriage is movable, resilient means interposed between said last-named support and the upper carriage arranged to transmit to the upper carriage movements of the support in a direction in which the upper carriage is movable, and a tracer and torch mounted on said tracer and torch support so that they move in unison and so that they are capable of universal movement in a plane by reason of the double rectilinear movability of the carriages.

OLIVER THURMAN, Jr.

REFERENCES CITED

The following references are of record in the file of this patent:

UNITED STATES PATENTS

| Number | Name | Date |
| --- | --- | --- |
| 1,956,581 | Krebs | May 1, 1934 |
| 2,278,607 | Anderson | Apr. 7, 1942 |
| 2,331,337 | Meyer | Oct. 12, 1943 |